US008746658B2

(12) United States Patent
Gauss et al.

(10) Patent No.: US 8,746,658 B2
(45) Date of Patent: Jun. 10, 2014

(54) COAXIAL VALVE WITH AN ELECTRIC DRIVE

(75) Inventors: Adolf Gauss, Koenigsbrunn (DE); Arno Voit, Hausham (DE)

(73) Assignee: Astrium GmbH, Taufkirchen (DE)

( * ) Notice: Subject to any disclaimer, the term of this patent is extended or adjusted under 35 U.S.C. 154(b) by 1155 days.

(21) Appl. No.: 12/672,931

(22) PCT Filed: Aug. 7, 2008

(86) PCT No.: PCT/DE2008/001304
§ 371 (c)(1),
(2), (4) Date: Oct. 4, 2011

(87) PCT Pub. No.: WO2009/021492
PCT Pub. Date: Feb. 19, 2009

(65) Prior Publication Data
US 2012/0012766 A1 Jan. 19, 2012

(30) Foreign Application Priority Data
Aug. 10, 2007 (DE) .......................... 10 2007 037 995

(51) Int. Cl.
*F16K 31/04* (2006.01)
(52) U.S. Cl.
USPC ....... 251/344; 251/129.12; 251/248; 251/347
(58) Field of Classification Search
USPC ............. 137/219, 221; 251/344, 347, 129.11, 251/129.12, 248
See application file for complete search history.

(56) References Cited

U.S. PATENT DOCUMENTS

| 2,294,286 A | 8/1942 | Dannenberg |
| 4,294,286 A | 10/1981 | Ohumi |
| 4,501,298 A | 2/1985 | Inada et al. |
| 5,826,613 A * | 10/1998 | Schalk .......................... 137/219 |
| 6,361,018 B2 | 3/2002 | Roth et al. |
| 6,802,488 B1 | 10/2004 | Patterson |
| 6,929,245 B2 * | 8/2005 | McCarty et al. .............. 251/344 |

(Continued)

FOREIGN PATENT DOCUMENTS

| DE | 19960330 A1 | 7/2001 |
| DE | 10227550 A1 | 12/2003 |

(Continued)

OTHER PUBLICATIONS

International Search Report dated Dec. 8, 2008 issued in connection with PCT/DE2008/001304.

*Primary Examiner* — Craig Schneider
(74) *Attorney, Agent, or Firm* — Leydig, Voit & Mayer, Ltd.

(57) ABSTRACT

A coaxial valve for regulating and blocking a fluid medium having a valve housing having at least one inlet opening, at least one outlet opening and a flow duct connecting the inlet opening to the outlet opening; a tubular valve sleeve disposed in an axially movable manner in a portion of the flow duct and having an inflow and an outflow opening for the medium, wherein the inflow and outflow openings open into the flow duct; a closure member disposed in the valve housing and arranged coaxially with the valve sleeve and configured to close the inflow opening; and a drive configured to axially move the valve sleeve and having an electric servomotor and a transmission part coupled between the servomotor and the valve sleeve, the transmission part configured to transmit an axial movement to the valve sleeve.

20 Claims, 1 Drawing Sheet

(56) References Cited

U.S. PATENT DOCUMENTS 7,066,447 B2 * 6/2006 McCarty et al. ............. 251/344
7,178,785 B2 * 2/2007 McCarty et al. ............. 251/235
7,322,560 B2 1/2008 Gauss et al.

FOREIGN PATENT DOCUMENTS

| DE | 102005028584 A1 | 1/2007 |
| EP | 1371885 A2 | 12/2003 |
| EP | 1703185 A1 | 9/2006 |

* cited by examiner

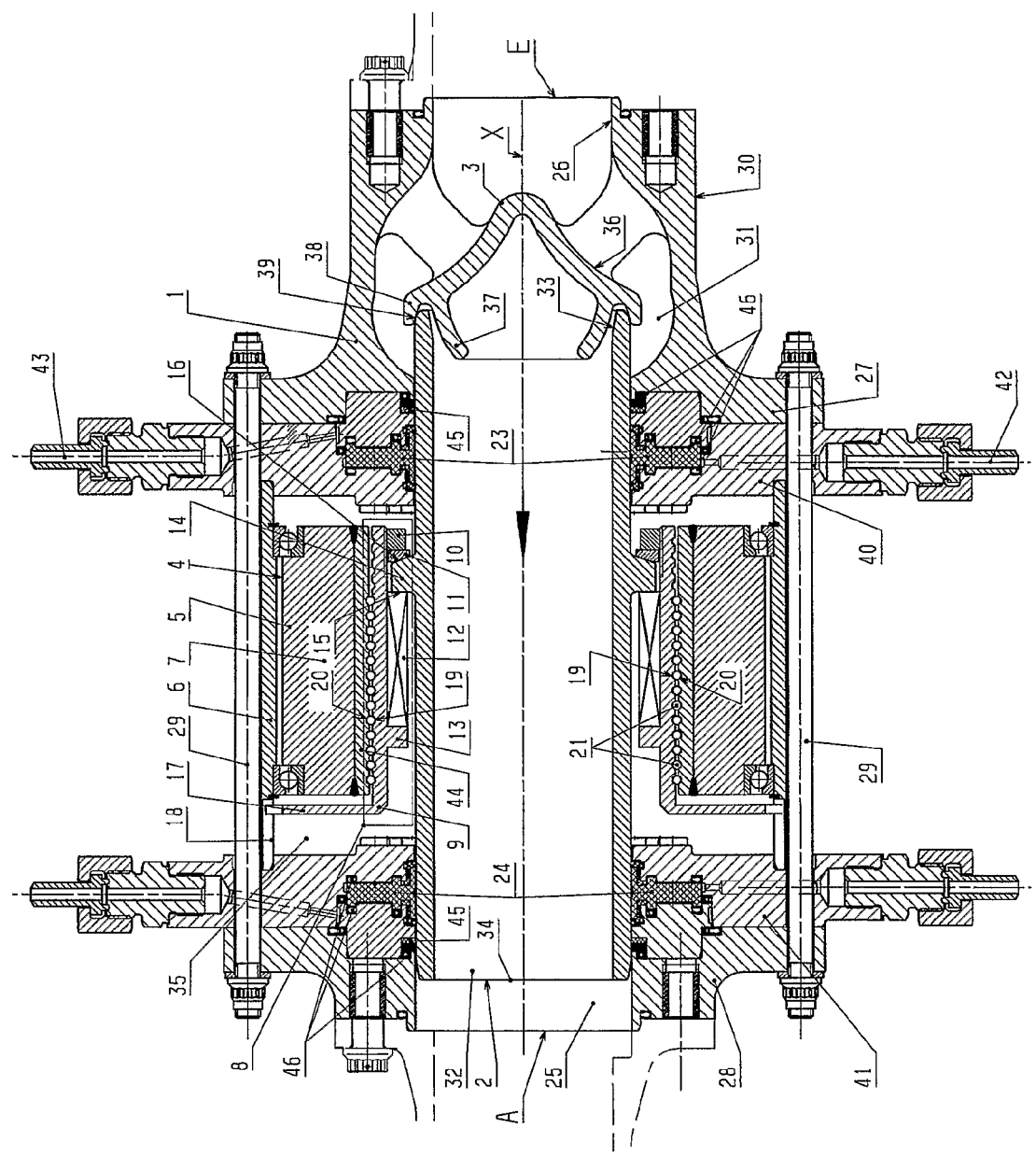

COAXIAL VALVE WITH AN ELECTRIC DRIVE

This application is a U.S. National Phase Application under 35 U.S.C. §371 of International Application No. PCT/DE2008/001304, filed on Aug. 7, 2008 and claims benefit to German Patent Application No. DE 10 2007 037 995.3, filed on Aug. 10, 2007. The International Application was published on Feb. 19, 2009 as WO 2009/021492 under PCT Article 21 (2).

The invention relates to a coaxial valve for regulating and blocking a liquid or gaseous medium, in particular a coaxial valve for cryogenic fluid. The coaxial valve comprises a valve housing, which has at least one inlet opening and one outlet opening and also a flow duct which connects said openings to one another. A tubular valve sleeve is provided, which is provided in an axially movable manner in a portion of the flow duct and which has an inflow opening and an outflow opening for the medium, both of these openings opening out into the flow duct. A closure member provided in the valve housing is arranged coaxially with respect to the valve sleeve and is configured to close off the outflow opening of the valve sleeve. A drive is provided for axially moving the valve sleeve, the drive being formed by an electric servomotor and by a transmission part which is coupled between the servomotor and the valve sleeve for transmitting an axial movement to the valve sleeve.

BACKGROUND

Specific requirements are set for valves which are used for regulating and blocking a liquid or gaseous medium under extreme conditions, such as chemical aggression, very high or very low temperatures or under very high pressures. One application for valves which are used for blocking a liquid or gaseous medium under extreme conditions is that of drives in the aerospace field. In this case, the valves are subjected, on the one hand, to extreme temperatures and extreme temperature changes. In the case of valves for liquid and gaseous rocket fuels, there are further parameters such as high mass flow rates, high pressures and short switching times for opening and closing as well as the adoption a predetermined position.

In the aerospace field, a coaxial valve is used for blocking a liquid or gaseous medium, which contains a valve housing comprising an inlet and an outlet for the medium to be blocked, a valve sleeve mounted in the valve housing so as to be longitudinally displaceable in the axial direction between an open position and a closed position and in a sealed relationship with the valve housing, through which the medium to be blocked flows when the valve is open in the longitudinal direction and a closure member arranged coaxial with the valve sleeve at one end of said valve sleeve, against which closure member the valve sleeve bears sealingly in the closed position and from which closure member the valve sleeve is distanced in the open position, opening up a valve opening cross section, and a servo for opening and closing the valve.

A generic coaxial valve of this type is disclosed in DE 199 60 330 A1. In this known valve, the valve sleeve is axially moved relative to the closure member, which is fixed in the flow duct, by means of a lever mechanism which is actuated by an electric or pneumatic servo provided outside the valve housing. In said valve, actuation via the lever mechanism is complex and thus increases the risk of malfunction in a manner which is unacceptable for aerospace applications.

A further coaxial valve is disclosed in DE 10 2005 028 584 A1. In said valve, the valve sleeve is provided on its outer periphery, at least over portions, with a channel-shaped outer helical groove and is surrounded in the portion of the channel-shaped outer helical groove by a drive sleeve which is coaxial with the valve sleeve. The drive sleeve is provided on its inner periphery with at least one channel-shaped inner helical groove which is adapted to the outer helical groove in such a way that the inner and outer helical grooves engage with one another via balls which run in them, and thus form a recirculating-ball gearing of a recirculating-ball spindle drive. The drive sleeve is rotatable in the valve housing, but axially rigidly mounted and subjected to rotational action by a drive motor provided inside the valve housing. The drive motor and the drive sleeve form the drive for the valve sleeve by incorporating the portion integrated in the valve sleeve with the channel-shaped outer helical groove and the balls. The valve sleeve is thus identical to the spindle of the recirculating-ball spindle drive thus formed.

An electro-mechanical coaxial valve is further disclosed in U.S. Pat. No. 6,802,488 B1. Said coaxial valve is unsuitable, however, for the operation of liquid or gaseous media under high pressure and, in particular, unsuitable for cryogenic fluids. A reason for this is that at temperature differences and/or higher pressures the spindle drive may seize up and/or become stiff due to radial pipe expansion. To compensate for this drawback, a powerful servo is therefore required which has a correspondingly high energy requirement.

SUMMARY OF THE INVENTION

An aspect of the present invention is to provide a coaxial valve which with a compact construction, permits reliable operation and only consumes minimal energy.

By means of the invention, a coaxial valve is provided for regulating and blocking a liquid or gaseous medium, in particular a cryogenic fuel. Said coaxial valve comprises a valve housing which has at least one inlet opening and one outlet opening and also a flow duct which connects said openings to one another. A tubular valve sleeve is provided in an axially movable manner in a portion of the flow duct and has an inflow opening and an outflow opening for the medium, both of these openings and opening out into the flow duct. A closure member provided in the valve housing is arranged coaxially with the valve sleeve and is configured to close off the inflow opening of the valve sleeve. A drive for axially moving the valve sleeve is provided, the drive being formed by an electric servomotor and a transmission part which is coupled between the servomotor and the valve sleeve for transmitting an axial movement to the valve sleeve. In this case, the transmission part is formed by a drive sleeve and a spring pack. The drive sleeve which is coaxial with the valve sleeve comprises a driver which is arranged on said drive sleeve and can be placed in engagement with the valve sleeve in order to move the valve sleeve in a first direction. The spring assembly, which is coaxial with the valve sleeve, acts in the axial direction and is supported on the drive sleeve and on the valve sleeve, makes it possible to move the valve sleeve in a second direction which is opposite to the first direction.

The first direction thus corresponds to an opening of the valve. The movement in the second direction corresponds to a closure of the valve.

The coaxial valve according to the invention is characterised by its high level of reliability even under extreme conditions. Said coaxial valve may thus be produced in a compact, rigid coaxial arrangement, whereby it may be easily incorporated in installation spaces. The coaxial valve can be adjusted directly between the open position and the closed position in a highly accurate manner. In this regard, the high adjusting speeds may be implemented with low energy consumption. A further advantage is that the actuating time between the open position and the closed position and/or from a predetermined position to a further predetermined position may be freely selected. The valve thus remains sealed in the closed position by means of the spring-loaded device, without the application of current. Due to fewer mobile parts, the valve is robust and unlikely to fail; in particular it is also unsusceptible to engine vibrations. The coaxial valve is provided with a dual sealing system (preliminary seal and dual main seal) having, in each case, a leakage line arranged therebetween, whereby substantial protection against explosion is achieved. By enclosing the drive and optionally rinsing the inner chamber with inert gas, the protection against explosion may be further improved. Even in a standard embodiment, without enclosure and rinsing of the engine compartment, said valve may be operated immersed in gases and liquids. Moreover, it may be electrically controlled in a simple manner.

According to any one embodiment, the spring assembly is arranged between a spindle, which is arranged on the drive sleeve on the inner peripheral side, and a ball and socket segment which is arranged on the valve sleeve on the outer peripheral side. In order to seal the valve without the application of current, according to a further embodiment it may be provided to bias the spring assembly when the valve sleeve bears against the closure member.

In a further embodiment, it is provided for the spindle to be an integral component of the drive sleeve. It may also be provided that the ball portion of the ball and socket segment is an integral component of the valve sleeve. These variants promote simple and cost-effective manufacture of the coaxial valve.

A further embodiment provides for the spring assembly to bear against a first, radially-extending bearing portion of the ball and socket segment. As a result, a defined bearing surface is provided for the spring assembly, the reliability of the valve thus being increased.

The force introduction via the ball and socket segment for opening the valve sleeve and the biased spring assembly for closing the valve sleeve prevents constraining forces, as a result of angular alignment errors, between the valve axis and drive axis and provides a clamping force for which no additional energy is required in the closed state.

In a further embodiment, the driver is configured as an adjusting ring which is arranged on the drive sleeve on the inner peripheral side and introduces a force on a second bearing portion of the ball and socket segment opposing the first portion. As a result, the ball and socket segment is arranged on the valve sleeve between the spindle and the driver. The separate configuration of the driver from the drive sleeve permits simple assembly of the coaxial valve.

According to a development, the contact surface between the ball portion and socket portion of the ball and socket segment has an incline extending outwardly away from the valve sleeve and facing the first bearing portion. This development promotes a smooth-running axial displaceability of the valve sleeve.

According to a further embodiment, the drive sleeve is radially and non-rotationally mounted on the valve housing. The load path therefore has to be closed. This is necessary in order to convert the rotation into an axial movement. As a result, it is ensured that the drive sleeve carries out a co-linear movement relative to the direction of movement of the valve sleeve. In addition to improved reliability, precision is thus also improved when adjusting the valve sleeve.

In a further embodiment, the drive sleeve is surrounded by a rotor of the drive motor and axially movably mounted relative thereto. The coaxial arrangement of the motor relative to the valve sleeve ensures a particularly compact construction of the coaxial valve. Thus, the rotor is advantageously surrounded by a stator of the drive motor, said stator being mounted non-rotationally in the valve housing.

It is also expedient if the drive sleeve is provided on its outer periphery, at least over portions, with at least one channel-shaped outer helical groove, and if the rotor of the drive motor is provided on its inner periphery with at least one channel-shaped inner helical groove, which is adapted to the outer helical groove in such a way that the inner and outer helical grooves engage with one another via balls which run in them and thus form a recirculating-ball gearing of a recirculating-ball spindle drive. The drive sleeve is thus identical to the spindle of the recirculating-ball spindle drive thus formed. An advantage is the compact construction achieved, in particular, by integration of the drive sleeve in the recirculating-ball spindle drive and the resulting low weight and resistance to vibration. Moreover, according to the invention, as an alternative to the recirculating-ball spindle, a planetary roll spindle (possibly of differential configuration) may also be used; this results in the same advantages.

In a further embodiment, the valve sleeve has a smooth outer surface. Expediently, the valve sleeve is of thin-walled configuration in order to keep the hydraulic forces low. Moreover, the valve sleeve is radially uncoupled from the spindle and/or the drive sleeve.

In one embodiment, the valve sleeve is mounted in the valve housing with at least two plain bearings arranged remotely from one another. In this case, the at least two plain bearings may have different diameters, whereby a force equalisation is produced on the sealing seats.

In a further embodiment of the coaxial valve, the at least two plain bearings have, on their end faces, sealing lips which are remote from one another and are manufactured as an integral component, in order to minimise tolerance chains and secondary leakage paths.

In a further embodiment of the coaxial valve, in order to seal the valve sleeve a preliminary seal and a main seal are used for each bearing point so as to reduce the pressure difference in a gradual manner.

In a further embodiment of the coaxial valve, ventilation lines (vent lines) are arranged between every two sealing lips in order to produce the pressure difference and to discharge leaks in a controlled manner.

In a further embodiment of the coaxial valve, the secondary leakage paths on the plain bearing are sealed by auxiliary seals in order to compensate for thermal expansion and thus minimise leaks.

In the coaxial valve according to the invention, between the two bearing points an inner chamber is produced, isolated from the pressure of the medium to be sealed. Moreover, as a result of the sealing lips of the main seal facing said inner chamber, the inner chamber is free from leakage gas and able to be conditioned with inert gas. Moreover, the outer housing may be welded by peripheral seams at the separation points in order to increase the external seal.

BRIEF DESCRIPTION OF THE DRAWINGS

The invention is described in more detail hereinafter with reference to an embodiment.

The only FIGURE shows a longitudinal section through a coaxial valve according to the invention.

DETAILED DESCRIPTION

In a valve housing 1 a flow duct 25 is provided which has a fluid inlet opening E and a fluid outlet opening A. The fluid inlet opening E and the fluid outlet opening A are thus configured at ends of the valve housing 1 remote from one another so that the flow duct 25 extends straight from the fluid inlet opening E to the fluid outlet opening A. The flow duct 25, the fluid inlet opening E and the fluid outlet opening A are configured to be circular in cross section and arranged coaxially relative to one another, comprising a common central axis X.

The first end-face cover part 27 has a cylindrical housing projection 30 protruding outwardly in the direction of the X-axis, which at its free end is provided with the fluid inlet opening E. In the region of the fluid inlet opening E the flow duct 25 is formed by a first cylindrical bore portion 26. In the interior of the cylindrical housing projection 30 a second bore portion 31 of the flow duct 25 is formed, said bore portion having a diameter which is greater than that of the first cylindrical bore portion 26. Between the second cylindrical bore portion 31 and the third bore portion 18 of the flow duct 25 in the region of the cylindrical central portion 29 of the valve housing 1, a cylindrical inner chamber is formed, the diameter thereof being markedly greater than that of the second bore portion 31.

The fluid outlet opening A is provided in a second end-face cover part 28 on the side of the valve housing 1 remote from the first end-face cover part. Between the first end-face cover part 27 and the second end-face cover part 28 extends a cylindrical central portion 29 of the valve housing 1. The two cover parts 27, 28 are, for example, screwed to the cylindrical central portion 29.

In the flow duct 25 a tubular valve sleeve 2 is arranged coaxially with the flow duct 25 between the second bore portion 31 and the fluid outlet opening A. The valve sleeve 2 is configured to be of annular cross section and may be moved along its axis which is configured to the central axis X. The valve sleeve 2 is configured as a straight tube, and surrounds an inner channel 32 which is provided with an inflow opening 33 on the end face adjacent to the fluid inlet opening E and an outflow opening 34 on the end face facing the fluid outlet opening A. The inner channel 32 thus forms a central portion of the flow duct 25 between the first cylindrical bore portion 26 and the fluid outlet opening A.

In the first end-face cover part 27, in the inside of the cylindrical housing projection 30, i.e. in the bore portion 31 of the flow duct 25, a closure member 3 is provided which is connected to the inflow opening 33 of the valve sleeve 2 to open and close the valve. The closure member 3 comprises an annular, conical base portion 36, which is arranged coaxially with the central axis X in the region of the fluid inlet opening E. An annular extension 37 is connected to the annular base portion 36, which extension is also arranged coaxially with the central axis X and extends in the axial direction towards the inner channel 32. The ends of the annular extension 37 facing the inner channel 32 have a convex outer surface. Said surface faces an annular and substantially cylindrical shoulder portion 38 of the conical base portion 36. Between the annular extension 37 and the annular, substantially cylindrical shoulder portion 38 an annular groove-shaped support 39 is formed which represents a sealing seat. The support 39 is annular in cross section, the diameter being adapted to the diameter of the valve sleeve 2. In the closed state of the valve, the valve sleeve 2 bears sealingly against the support 39.

The closure member 3 and the first end-face cover part 27 may, as shown in the figure, be configured in one piece.

The valve sleeve 2 is mounted without anti-twist protection by two plain bearings 23, 24 in the valve housing 1. The plain bearings 23, 24 are in each case arranged in a bearing housing 40 and/or 41 and have at their end faces sealing lips oriented in opposing directions. The bearing housing 40 is thus adjacent to the first end-face cover part 27. The bearing housing 41 is adjacent to the second end-face cover part 28. Portions of the bearing housing 40, 41 may protrude beyond the cylindrical central portion 29 and be fastened thereto, for example, by screws. For force equalisation, different diameters may be provided on the two sealing seats formed by the plain bearings 23, 24.

The valve sleeve 2 is sealed at the bearing points 23 and 24 (main seal) and by the preliminary seal 45 which is configured to be robust. The leakage of the preliminary seal 45 is fed back by the vent line 43, for example, into the fuel tank. Between the preliminary seal and the first lip of the main seal facing said preliminary seal, a space is produced at a reduced pressure level, whereby the main seal experiences low leakage, as it only operates against a small pressure difference. This small amount of leakage is discharged via the vent line 42 against ambient pressure or a vacuum. The sealing lip of the main seal 23, 24 facing the inner chamber (engine compartment) prevents infiltration of leakage gas or humidity from the vent line 42. If the engine compartment is pressurised with inert gas, it is sealed against the vent line 42 in order to minimise the rinsing gas losses. Advantageously, the main seal 23, 24 with a plain bearing function is manufactured as an integral component from high performance plastics materials. With fuels at very low temperatures, all secondary leakage paths on the seal have to be additionally sealed by means of metallic C-rings 46 due to the high degree of shrinkage of the sealing material relative to the metal housing.

In an inner chamber 35 of the valve housing 1 a drive 4 is provided which acts on the valve sleeve 2 for movement in the axial direction along the central axis X and is disclosed hereinafter.

The drive 4 comprises a servomotor 5 which is arranged inside the inner chamber 35, configured as an electric motor and surrounds the valve housing 2. A stator 6 of the servomotor 5 is arranged non-rotationally on the cylindrical central portion 29 of the valve housing 1. The stator 6 surrounds a rotor 7 which, in turn, surrounds a drive sleeve 9. The drive sleeve 9 is provided on the outer peripheral side, at least over portions, with a channel-shaped outer helical groove 19. Similarly, the rotor 7 of the servomotor 5 on its inner periphery has a channel-shaped inner helical groove 20. Said helical groove may, for example, be incorporated in a nut 44 connected to the rotor, which nut is rotationally engaged with the rotor. The inner helical groove 20 is adapted to the outer helical groove 19 so that said helical grooves are in engaged with one another via balls 21 running in them, and thus a recirculating-ball gearing of a recirculating-ball spindle drive is formed. Alternatively, instead of the recirculating-ball spindle drive, a planetary roll spindle may be driven. As a result, by rotation of the rotor 7, the drive sleeve 9 is moved coaxially with the valve sleeve 2.

The drive sleeve 9 has low-friction anti-twist protection 17, which may be implemented by a lever extending in the direction of the cylindrical central portion 29. Said lever is adjacent to the cylindrical central portion 29 with its end remote from the drive sleeve 9 and is brought into engagement there with a housing portion 18. The housing portion 18 may, for example, be an integral component of the cylindrical central portion 29.

On the inner periphery on the drive sleeve 9, an annular spindle 13 is provided. The annular spindle 13 is an integral component of the drive sleeve 9. Between the annular spindle 13 and a ball and socket segment 14, 11 arranged on the valve sleeve 2 on the outer peripheral side, a spring assembly 12 is provided. The spring assembly 12 extends in an annular manner about the valve sleeve 2 and bears against a radially extending first bearing portion 15 of the ball portion of the ball and socket segment 14.

If the valve sleeve 2, as shown in the figure, is in its closed position, the spring assembly 12 is preferably biased. The closed position is present when the valve sleeve 2 bears with its inflow opening 33 against the support 39 of the closure member 3.

The ball portion of the ball and socket segment 14 is an integral component of the valve sleeve 2 and has a second bearing portion 16 which opposes the first bearing portion 15 and has an incline extending outwardly away from the valve sleeve 2 and facing the first bearing portion 15. On the inner periphery of the drive sleeve 9, an adjusting ring 10 is fastened which serves as a driver and via the socket portion of the ball and socket segment 11 introduces a force for opening the valve sleeve 2. By the rigid connection of the adjusting ring 10 with the drive sleeve 9, with a corresponding rotational direction of the servomotor 5, the axial movement of the drive sleeve 9 is transmitted via the ball and socket segment 14, 11 to the valve sleeve 2, whereby said valve sleeve is moved away from the closure member 3 and a connection between the inflow opening 33 and the bore portion 3 and the fluid outlet opening A is produced. The closure of the valve sleeve 2, which is introduced by a reverse rotational direction of the servomotor 5, is undertaken by a movement of the drive sleeve 9 extending in the direction of the fluid inlet opening E. As soon as the valve sleeve 2 comes to bear on its valve seat, i.e. the support 39, the spring assembly 12 is subjected to greater bias and the servomotor may be operated without the application of current, since a clamping force is present as a result of the spring-biased spring assembly 12. In this case, the spring assembly 12 is supported on the spindle 13 of the drive sleeve 9.

In the invention, force is introduced onto the valve sleeve 2 via a ball and socket segment 14, 11 whereby the valve 2 is opened. The valve is closed with the assistance of a biased spring assembly 12 which prevents constraining forces, as a result of angular alignment errors, between the valve axis and the drive axis, and moreover provides a clamping force in the closed state, without the need to apply current to a servomotor.

The vent lines (leakage lines) 42, 43 are guided in the component as radial bores to intermediate spaces of seals, in order to divert leaks. They are the primary structural measures used to counter the uncontrolled formation of explosive mixtures in greater quantities. The vent line 43 returns the leakage of the preliminary seal 45 into the fuel tank and thus reduces the pressure level on the mutually opposed sealing lips of the plain bearings 23, 24, whereby the sealing action thereof is improved. The remaining small leakage of the dynamic main seal at the engine compartment is discharged by the vent line 42 against ambient pressure, a vacuum or gettering material. The sealing lips of the plain bearings 23, 24 facing the engine compartment prevent the infiltration of leaked gases and/or moisture into the engine compartment. In the reverse direction, they prevent the discharge of inert gas into the vent line, if the engine compartment is pressurised as a protective measure, for example, against hydrogen embrittlement. In order to improve the external leakage in the explosion-protective embodiment, and/or in order to prevent the penetration of water into the valve, for example in deep sea applications, the housing may be hermetically sealed at the periphery by weld seams, which are subjected to low mechanical loads, at the separation points. Further explosion-protective measures are enclosure of the engine and diversion of electrostatic charge to the bearing points.

LIST OF REFERENCE NUMERALS

A Fluid outlet opening
E Fluid inlet opening
X Central axis
1 Valve housing
2 Valve sleeve
3 Closure member
4 Drive
5 Servomotor
6 Stator
7 Rotor
8 Transmission part
9 Drive sleeve
10 Driver (adjusting ring)
11 Socket portion of ball and socket segment
12 Spring assembly
13 Spindle (spring abutment)
14 Ball portion of ball and socket segment
15 First bearing portion of the ball and socket segment
16 Second bearing portion of the ball and socket segment
17 Anti-twist lock of the drive sleeve
18 Housing portion of the valve housing for engagement of the anti-twist lock
19 Outer helical groove of the drive sleeve
20 Inner helical groove of the rotor
21 Balls
22 Recirculating-ball gearing
23 Plain bearing (with sealing lip)
24 Plain bearing (with sealing lip)
25 Flow duct
26 First cylindrical bore portion
27 First end-face cover part
28 Second end-face cover part
29 Tie rod (cylindrical central portion)
30 Housing projection
31 Second bore portion
32 Inner channel
33 Inflow opening
34 Outflow opening
35 Inner chamber (engine compartment)
36 Conical base portion
37 Annular extension
38 Shoulder portion
39 Support (valve seat)
40 Bearing housing
41 Bearing housing
42 Vent line leakage line
43 Vent line leakage line
44 Nut
45 Preliminary seal
46 Auxiliary seal (metal C-ring)

The invention claimed is:

1. A coaxial valve for regulating and blocking a liquid or gaseous medium comprising:
  a valve housing having at least one inlet opening, at least one outlet opening and a flow duct connecting the at least one inlet opening to the at least one outlet opening;
  a tubular valve sleeve disposed in an axially movable manner in a portion of the flow duct and having an inflow and an outflow opening for the medium, wherein the inflow and the outflow openings open into the flow duct;
  a closure member disposed in the valve housing and arranged coaxially with the valve sleeve and configured to close the inflow opening; and
  a drive configured to axially move the valve sleeve and having an electric servomotor and a transmission part coupled between the servomotor and the valve sleeve, the transmission part configured to transmit an axial movement to the valve sleeve and including:
- a drive sleeve disposed coaxially with the valve sleeve and having a driver disposed on the drive sleeve and engageable with the valve sleeve so as to move the valve sleeve in a first direction; and
- a spring assembly disposed coaxially with the valve sleeve, the spring assembly acting in the axial direction and supported on the drive sleeve and on the valve sleeve in order to move the valve sleeve in a second direction opposite the first direction so as to maintain a sealing force.

2. The coaxial valve as recited in claim 1, further comprising a spindle and a ball and socket segment, the spindle disposed on an inner peripheral side of the drive sleeve and the ball and socket segment disposed on an outer peripheral side of the valve sleeve, wherein the spring assembly is disposed between the spindle and the ball and socket segment.

3. The coaxial valve as recited in claim 1, wherein the spring assembly is biased when the valve sleeve bears against the closure member.

4. The coaxial valve as recited in claim 2, wherein the spindle is an integral component of the drive sleeve.

5. The coaxial valve as recited in claim 2, wherein a ball portion of the ball and socket segment is an integral component of the valve sleeve.

6. The coaxial valve as recited in claim 2, wherein the spring assembly bears against a first radially-extending bearing portion of the ball portion of the ball and socket segment.

7. The coaxial valve as recited in claim 6, wherein the driver includes an adjusting ring disposed on the inner peripheral side of the drive sleeve and is configured to introduce a force on a second bearing portion of the ball portion of the ball and socket segment opposing the first bearing portion via a socket portion of the ball and socket segment.

8. The coaxial valve as recited in claim 7, wherein the second bearing portion of the ball portion of the ball and socket segment has an incline extending outwardly away from the valve sleeve.

9. The coaxial valve as recited in claim 1, wherein the drive sleeve is radially and non-rotationally mounted on the valve housing.

10. The coaxial valve as recited in claim 1, wherein the drive includes a rotor surrounding the drive sleeve, wherein the drive sleeve is axially movably mounted relative to the rotor.

11. The coaxial valve as recited in claim 10, wherein the drive includes a stator surrounding the rotor and mounted non-rotationally in the valve housing.

12. The coaxial valve as recited in claim 11, wherein the drive sleeve includes at least one channel-shaped outer helical groove on an outer periphery of the drive sleeve, and wherein the rotor includes at least one channel-shaped inner helical groove disposed on an inner periphery of the drive sleeve, wherein the inner helical groove is adapted to the outer helical groove such that the inner and outer helical grooves engage one another via balls running in the inner and outer helical grooves.

13. The coaxial valve as recited in claim 12, wherein the inner and the outer helical grooves engaging one another via balls form one of a recirculating-ball gearing of a recirculating-ball spindle drive and an inner helical groove axially moved via planetary rollers.

14. The coaxial valve as recited in claim 1, wherein the valve sleeve has a smooth outer surface.

15. The coaxial valve as recited in claim 1, wherein the valve sleeve is mounted on the valve housing using at least two plain bearings disposed remotely from one another.

16. The coaxial valve as recited in claim 15, wherein the at least two plain bearings have different diameters.

17. The coaxial valve as recited in claim 15, wherein each of the at least two plain bearings include end faces and a sealing lip disposed on each end face.

18. The coaxial valve as recited in claim 15, wherein each of the at least two plain bearings correspond to a preliminary seal and a main seal.

19. The coaxial valve as recited in claim 17, further comprising ventilation lines disposed between every two sealing lips.

20. The coaxial valve as recited in claim 17, further comprising auxiliary seals sealing a secondary leakage path corresponding to each of the at least two plain bearings.

* * * * *